United States Patent Office 3,297,396
Patented Jan. 10, 1967

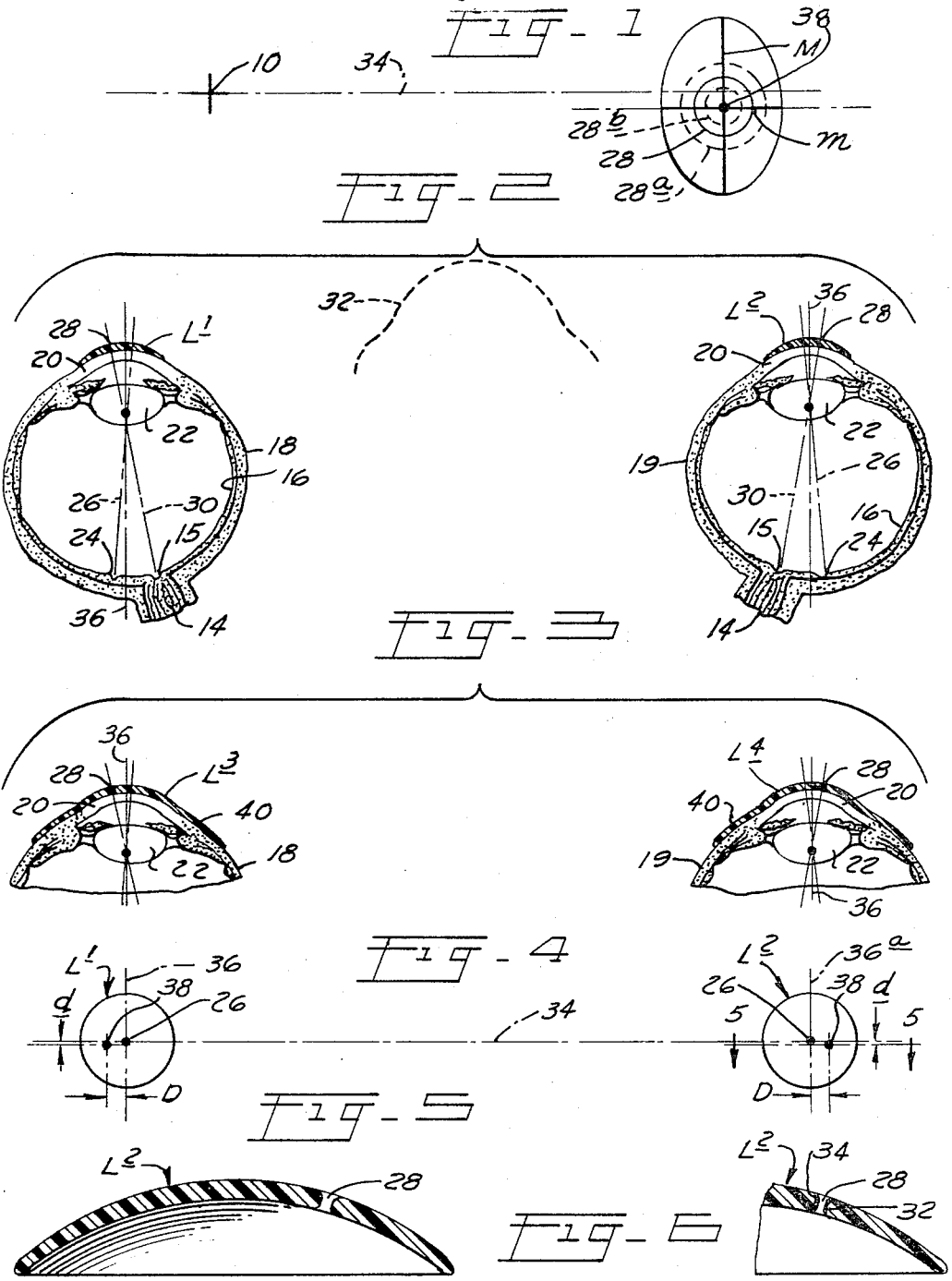

3,297,396
CONTACT LENS WITH BLIND SPOT APERTURE
Newton K. Wesley, Chicago, Ill., assignor to The Plastic Contact Lens Company, Chicago, Ill., a corporation of Illinois
Filed Apr. 7, 1964, Ser. No. 357,886
3 Claims. (Cl. 351—160)

This invention relates to a contact lens having an aperture therein so located relative to the visual axis of the lens that an image of the aperture on the retina falls within the blind spot thereof. This application is a continuation-in-part of my copending application Serial No. 156,254, filed December 1, 1961, now abandoned.

One object of the invention is to provide a contact lens either of the corneal or scleral type which is apertured in order to provide for heat dissipation and to aid in tear circulation through the lens, thus reducing photophobia, fogging caused by mucus accumulations under the lens, night halos, rainbows, and other side effects sometimes experienced with contact lenses. At the same time it is desirable to place the aperture so that, if possible, it does not interfere with vision.

Accordingly another object is to provide a lens which is fitted to the cornea and/or the sclera of the eye to minimize rotation and excessive lens movement, and which then has the aperture through the lens located so that the image thereof falls on the blind spot of the eye and is therefore entirely unnoticed by the wearer of the lens yet accomplishes the desired results of ventilating the lens, reducing irritation of the lens on the eye and restoring normal corneal metabolism and nutrition which are sometimes interfered with due to stagnation of the lacrimal fluid between the lens and the eye, and which sometimes produce an uncomfortable amount of heat. Such an aperture also tends to "pump" lacrimal fluid through the lens and from under its edge upon blinking by reason of the blink producing pressure against the lens. An aperture also reduces the suction of the lens on the cornea and results in the possibility of longer wearing periods without discomfort.

A further object is to provide a practical fitting method for apertured contact lenses, and accurate location of the aperture with respect to the visual axis of the lens to insure that the aperture will coincide with the projection of the blind spot to the surface of the cornea.

An additional object of the invention is to reduce the amount of scattered light which may be caused by the aperture which reaches the retina of the eye.

It is also an object of the invention to reduce the reflective properties of the material which forms the aperture.

With these and other objects in view, my invention consists in the provision of a contact lens with a "blind spot aperture," whereby the objects above contemplated are attained, as hereinafter more fully set forth, pointed out in my claims and illustrated in detail on the accompanying drawing wherein:

FIG. 1 is a diagrammatic chart of the blind spot of the right eye of a patient.

FIG. 2 is a horizontal sectional view through both eyes in relation to each other and showing in cross section a pair of my apertured contact lenses in relation to the blind spot of each eye, the lenses illustrated being of corneal type, the scale being 2×.

FIG. 3 is a somewhat similar view showing scleral type lenses which are apertured in accordance with my invention.

FIG. 4 is a posterior view of the lenses shown in FIG. 2 and illustrates their relation to each other.

FIG. 5 is a further enlarged cross section of one of the lenses as taken on the line 5—5 of FIG. 4 at a scale of 10×.

FIG. 6 is a further enlarged partial cross section of one of the lenses at a scale of 10× disclosing a second embodiment of my invention wherein the ring of material which defines the aperture has been treated to reduce the reflective properties thereof; and FIG. 7 is a diagrammatic perspective view of material having less reflective properties than the material of the lense which is associated with the aperture.

Referring to FIG. 1, the blind spot of the right eye is charted with the eye normal to the chart surface and spaced about 40 cm. away from the cross indicated at 10. While fixating the left eye on the cross 10 and exploring the blind spot by moving a black dot or the like over and adjacent the area indicated by the ellpise 12, it will be found that the average eye does not see the dot within the area 12 which area therefore is a projection of the "blind spot" of the eye to the chart surface. This blind spot is an area that results from the entrance of the optic nerve 14 (see FIG. 2) through the retina 16 of the eye 18, which area is devoid of the rods and cones that constitute the optic nerve endings at the surface of the rest of the retina for transmiting images therefrom to the brain for interpretation.

With further reference to FIG. 2, the cornea of the eye 18 is illustrated at 20 and the crystalline lens thereof at 22. The fovea centralis of the retina 16 is indicated at 24 and the visual of fixation axis of the eye at 26. The right eye is designated 19. Both eyes of course have the same elements and each has a fixation axis 26 which axes involve central vision as distinguished from peripheral vision which falls on the retina 16 surrounding the fovea 24. Lenses $L^1$ and $L^2$ are illustrated on the left and right eyes 18 and 19 respectively, these lenses being of the corneal type. Each lens has an aperture 28 to permit interchange of tears through the lens and accomplish the various advantages set forth in the above objects. Walls of material 32 define the aperture 28. Heretofore apertures have been provided such as shown in Riddell Patent No. 2,393,266, Silverstein Patent No. 2,641,-161, and British Patent to Bier No. 592,055. These apertures however have been provided in the scleral flanges of scleral lenses. Even in corneal lenses however apertures are desirable as indicated by De Carle in "The Optician," July 3, 1953 and December 10, 1954 (page 530) wherein they were provided outside the optical zone of the lens. This optical zone is approximately 6 mm. in diameter, and recently lenses have appeared on the market containing apertures within the optical zone, specifically at the center thereof. Apertures within all but the blind spot of the optical zone however interfere with vision as they are readily seen by the patient and introduce areas of distortion by their presence.

My invention accordingly contemplates the placement of the aperture 28 where it is entirely unseen or its appearance at least minimized by placing it to correspond with the blind spot or optic nerve 14 as shown by blind spot axis lines 30 in FIG. 2 passing through the nodal point of the crystalline lens 22 as illustrated. It will be noted that the aperture 28 is centered on these axes 30. Since the optic nerves 14 are located nasally (the nose being indicated by the dotted lines 32) the apertures 28 are located temporally.

Also the optic nerves 14 are slightly higher than a horizontal plane through the fixation axes 26 and therefore the apertures 28 are located inferiorly as shown in FIG. 4. In this figure dots 26 indicate the fixation axes on the lenses $L^1$ and $L^2$ and it will be noted that the apertures 28 are located distance D temporally of the axes 26 and distance $d$ inferiorly in relation to the horizontal axis or plane 34 of the axes 26, their vertical planes being indicated 36 and 36a respectively.

When projecting the blind spot of the average human eye to the anterior surface of the cornea, it will be found that the intersection of the major and minor axes M and $m$ (see FIG. 1) indicated by the dot 38 is about 1.5° below the horizontal plane 34 shown in FIG. 1 and about 15° from the vertical plane 36. Accordingly the distances $d$ and D in FIG. 4 correspond to these angles. At the anterior surface of the cornea and the posterior surface of the lens, $d$ is approximately .3 mm. and D is approximately 1.9 mm.

In fitting the lens to the cornea, first the fixation axis 26 for each lens must be located. This requires a lens that does not rotate and shifts but very little on the cornea. There are several ways of accomplishing this in a corneal type lens such as providing a toric anterior surface on the lens which substantially fits the cornea. The cornea itself must be toric for this method to be satisfactory, and such methods are disclosed in prior publications as follows:

The Optician, May 1, 1959, pages 407 and 408
Cycon Lens—by W/J—Fitting a Toric Inside Curve,
    The Plastic Contact Lens Company, August 1960
Clao papers, volume 2, No. 12, December 1960, page 59
Clao papers, volume 3, No. 1, January 1961, page 1
Clao papers, volume 3, No. 2, February 1961, pages 3 to 8
Clao papers, volume 3, No. 3, March 1961, pages 7 and 8

Other methods of preventing rotation of a corneal lens are shown in my copending applications, Serial No. 827,317, filed July 20, 1959 and Serial No. 828,318, filed July 20, 1959, both now abandoned.

After the lens is thus fitted normally on the eye so as to eliminate rotation and excessive lens movement, the patient while wearing the lens is asked to fixate a small light source so that the fixation axis of the eye may be located on the lens by means of reflection of the light thereon. This of course is the fixation axis 26 represented by the cross 10 in FIG. 1 which may then be marked on the lens surface and of course will be the fixation axis for that particular lens on that particular cornea. These fixation axes may fall on the center of the lens or off center, the important consideration being to accurately locate them on the lens while it is substantially "fixed" to the eye by the fitting procedures referred to for corneal lenses.

Then to locate the position of the aperture 28 the measurements D and $d$ are used and the aperture drilled through the lens at the located point. Subsequently of course when the lens is applied to the eye it must be applied right-side-up to the proper eye or the aperture may not fall on the blind spot axis 30, being above instead of below if the lens is upside down and there is also the probability that the right cornea and lens differ from the left.

In FIG. 3 scleral lenses $L^3$ and $L^4$ are shown for the left and right eye, their scleral flanges being designated 40, and these likewise would have their apertures 28 aligned with the blind spot axes 30. Well-fitted scleral lenses do not rotate on the eyeball and shift but very little relative thereto so that they are well oriented relative to the eyeball and their fixation axes are therefore readily determined. The apertures 28 may be located as indicated in FIG. 4 relative thereto using the same dimensions D and $d$.

As to the size of the aperture 28, it must not be so small as to readily clog with mucus, and not so large that it will fall outside the projected blind spot 12 shown in FIG. 1. The average blind spot measures about .5 mm. by .7 mm. at the anterior surface of the cornea, and a maximum size of .35 mm. for the perforation 28 would be well within the .5 mm. width of the ellipse 12 with some chance for lens movement in respect to the eye without the edge of the aperture encroaching in the visual field outside the blind spot represented by the ellipse 12. The minimum size can be .15 mm. These two projected sizes are indicated in FIG. 1 as 28a and 28b respectively whereas the desired size of aperture is a compromise or lies between these limits and is preferably about .25 mm. indicated at 28.

As shown in FIG. 5 the edges of the aperture 28 are rounded and of course both the aperture and its edges would be highly polished to avoid any opacity in the lens which is usually made of methyl methacrylate.

The dimensions D and $d$ shown in FIG. 4 as above indicated are average. In most cases these dimensions can be used but in exceptional cases where the location of the blind spot is not average it can be explored as explained in connection with FIG. 1 and plotted, and the dimensions D and $d$ modified to suit. Otherwise the patient may have trouble with the edge of the aperture 28 being seen because of falling outside the blind spot area. The range of the dimension D may be anywhere from 1.7 mm. to 2.1 mm. whereas the range for the dimension $d$ may be anywhere from .1 mm. to .5 mm. Most blind spots which I have explored fall within these limits and the greater majority of them quite close to the dimensions of 1.9 mm. and .3 mm. as an average. As for size of the aperture, I have found a diameter about half the length of the minor axis $m$ suitable, or about .25 mm. Diameters between .15 mm. and .35 mm. are suitable on some patients depending on whether the lens moves on the cornea more or less than the average hereinbefore referred to.

FIGS. 6 and 7 relate to another embodiment of the invention wherein the material 32 which defines the aperture 28 is treated or changed to reduce the reflective properties of the material which forms the lens. The material which is applied to the walls of the aperture 32 is shown at 34. This material is preferably very thin and is somewhat opaque and preferably dark in color. It is preferable that the material be black. It may be applied to the aperture in any convenient manner. For example it may comprise a thin coating of lacquer or pigment, or it may be formed by polymerizing a dark plastic material. In addition the material could be applied by cementing or chemically bonding it to the walls of the aperture 28. It could even be a very thin ring of some preferably dull metal.

In any case the addition of the material 34 to the walls of the aperture 28 reduces the amount of scattered light which reaches the retina of the eye produced by the aperture.

Some changes may be made in the lens herein disclosed without departing from the real spirit and purpose of my invention, and it is my intention to cover by my claims any modification or mechanical equivalents which may reasonably be included within their scope.

I claim as my invention:

1. A contact lens of generally concavo-convex cross section having its posterior surface so fitted to the eye of a patient as to preclude rotation thereof relative to the eye and with a tendency to remain in a predetermined position relative thereto whereby the position on said lens of the fixation axis of the lens may be determined and will remain substantially fixed on said lens when worn, the central optical zone of said lens having a single aperture therethrough for tear interchange, the diameter of said aperture being not greater than approximately .35 millimeter, the axis of said aperture being positioned on said lens in offset relationship to said fixation axis to coincide with the axis of the blind spot of the eye, said aperture being defined by walls and means for reducing the reflective light produced by the aperture, said means comprising an application of low light reflecting material to said walls.

2. A contact lens of generally concavo-convex cross section having its posterior surface so fitted to the eye of a patient as to preclude rotation thereof relative to the eye and with a tendency to remain in a predetermined position relative thereto whereby the position on said lens of the fixation axis of the lens may be determined and will remain substantially fixed on said lens when worn, the central optical zone of said lens having a single aperture therethrough for tear interchange, the diameter of said aperture being not greater than approximately .35 millimeter, the axis of said aperture being positioned on said lens in offset relationship to said fixation axis to coincide with the axis of the blind spot of the eye, said aperture being defined by walls and means for reducing the reflective light produced by the aperture, said means comprising an application of low light reflecting material to said walls, said low light reflecting material being dark in color.

3. A contact lens of generally concavo-convex cross section having its posterior surface so fitted to the eye of a patient as to preclude rotation thereof relative to the eye and with a tendency to remain in a predetermined position relative thereto whereby the position on said lens of the fixation axis of the lens may be determined and will remain substantially fixed on said lens when worn, the central optical zone of said lens having a single aperture therethrough for tear interchange, the diameter of said aperture being not greater than approximately .35 millimeter, the axis of said aperture being positioned on said lens in offset relationship to said fixation axis to coincide with the axis of the blind spot of the eye, said aperture being defined by walls and means for reducing the reflective light produced by the aperture, said means comprising an application of low light reflecting material to said walls, said material being relatively opaque.

References Cited by the Examiner

UNITED STATES PATENTS 1,507,327 9/1924 Wrighton.
2,807,981 10/1957 Barnes _____ 88—32

OTHER REFERENCES

Friedberg: "Contact Lens Apertures and Toric Curve Designs," article in Journal of the American Optometric Association, vol. 32, No. 8, March 1961, pp. 642–644.

Korb: "A Preliminary Report on Toric Contact Lenses," article in The Optometric Weekly, vol. 51, No. 48, Dec. 1, 1960, pp. 2501–2505.

Korb: "Application of Multiple Micro Holes," article in Journal of the American Optometric Association, vol. 32, No. 11, June 1961, pp. 891 and 892.

DAVID H. RUBIN, *Primary Examiner.*